*INVENTOR.*
HENRY P. AMES, JR

July 14, 1964
H. P. AMES, JR
3,140,847
EJECTABLE FLIGHT RECORDER
Filed May 15, 1961
6 Sheets-Sheet 3
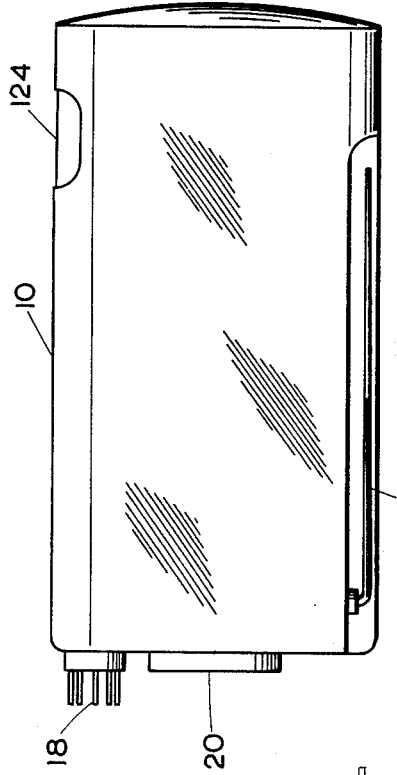
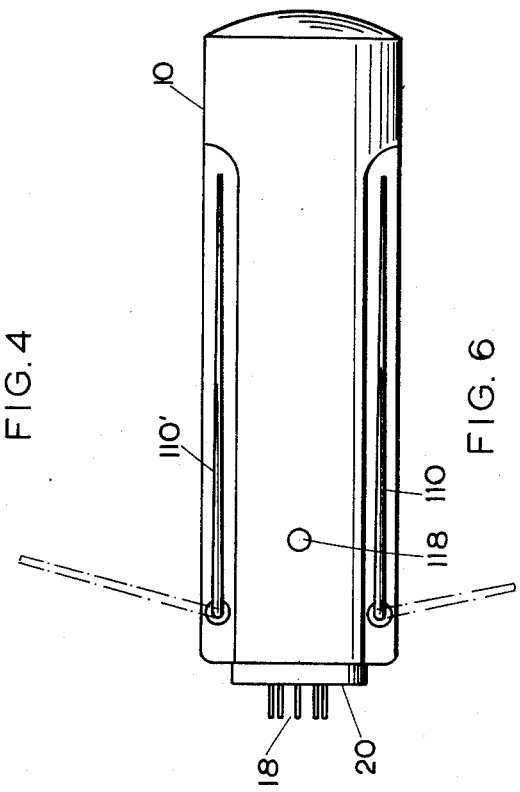
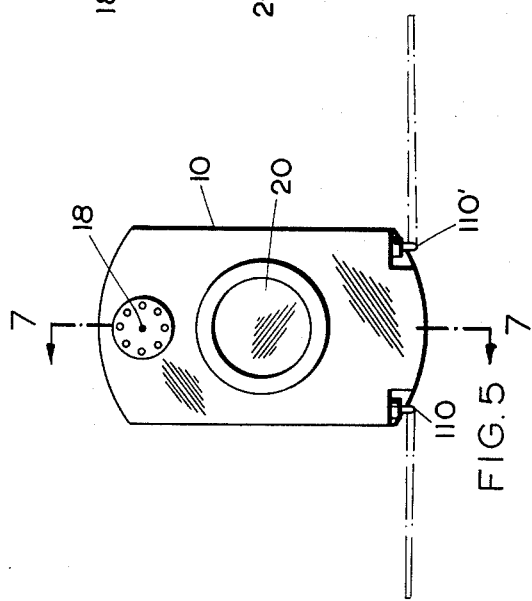
INVENTOR.
HENRY P. AMES, JR July 14, 1964  H. P. AMES, JR  3,140,847
EJECTABLE FLIGHT RECORDER
Filed May 15, 1961  6 Sheets-Sheet 4

INVENTOR.
HENRY P. AMES, JR
BY

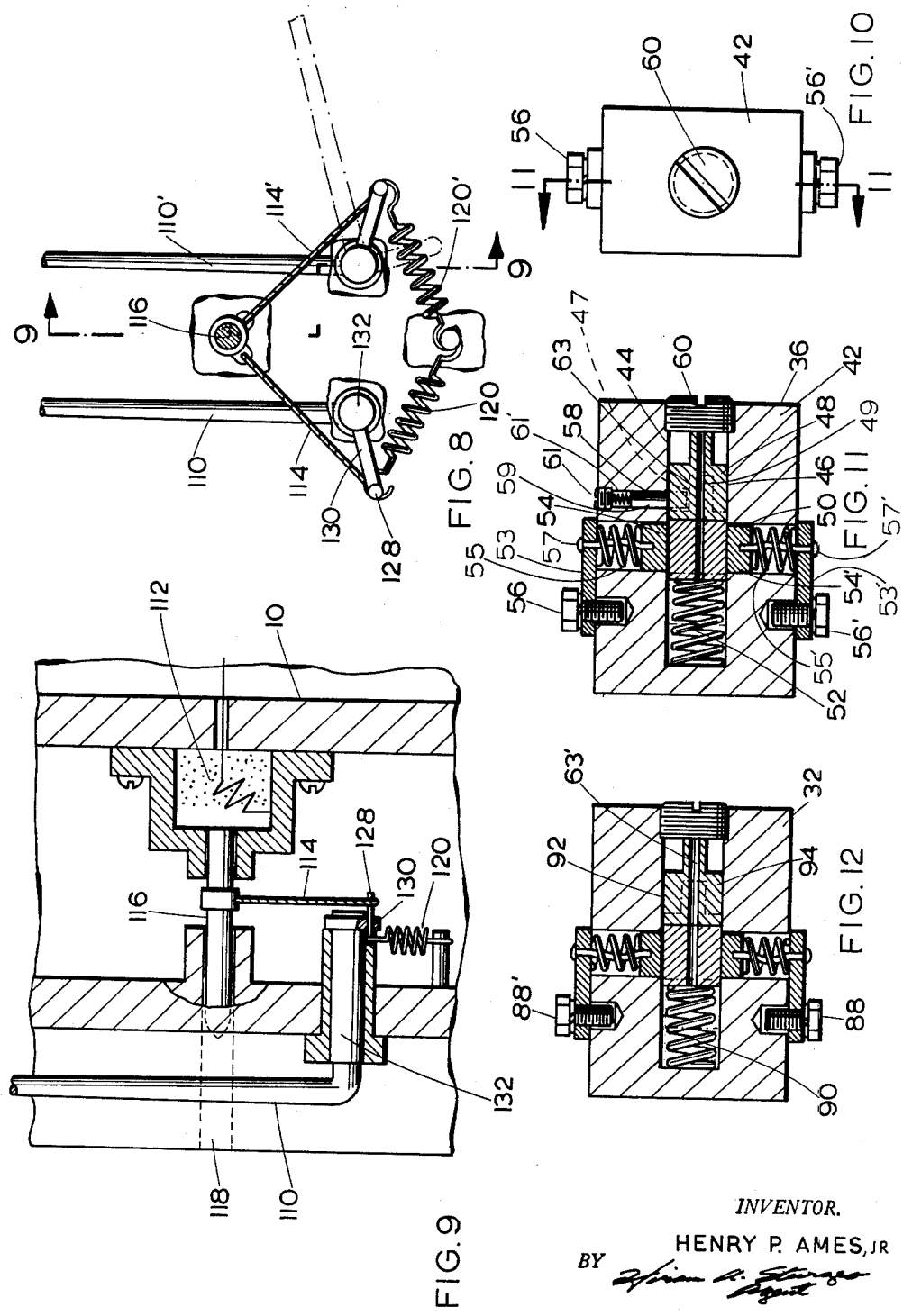

July 14, 1964

H. P. AMES, JR 3,140,847

EJECTABLE FLIGHT RECORDER

Filed May 15, 1961

INVENTOR.
HENRY P. AMES, JR
BY

United States Patent Office 3,140,847
Patented July 14, 1964

3,140,847
EJECTABLE FLIGHT RECORDER
Henry P. Ames, Jr., Salina, Kans.
(ACSC, Box 65–1147, Maxwell AFB, Ala.)
Filed May 15, 1961, Ser. No. 110,125
5 Claims. (Cl. 244—138)

This invention relates to recoverable ejectable flight recorder-data capsules designed to be automatically ejected from aircraft, or other aero-space vehicles in the event of an accidental landing, collision, or disaster.

The purpose of this invention is to provide a log or flight recorder-data capsule in aircraft, or other aero-space vehicles, and means for ejecting the capsule from the vehicle in an emergency, whereby a record of the performance of the aircraft may be preserved and the cause of an accident or disaster readily ascertained thereby.

In the conventional use of instruments for recording flight data of aircraft the flight recorder-capsule is installed in the airplane in the vicinity of the forward compartment, and recovery thereof, after an accident, is dependent upon the construction of the capsule together with the visual location of the wreckage in a relatively confined geographical area. The recovery of recorded flight data is, therefore, problematical.

As the design speed of airplanes and other aero-space vehicles increases, neither the construction of a permanently stowed flight recorder-data capsule nor the chances of finding the vehicle wreckage in a relatively confined geographical area can be depended upon to facilitate recovery of the recorded flight data. This would be particularly true in the case of a violent explosion of an aero-space vehicle which may be caused accidentally or through design, such as in the case of insurance fraud or suicide. The number of reportedly unsolved air disasters which have occurred in recent years will attest to this fact.

In the arrangement of the present invention the flight recorded-data capsule is retained in the furthermost aft position in the aircraft fuselage in a cavity fashioned to permit spontaneous egress of the capsule in a rearward direction. The flight recorder-data capsule is thus positioned so that it will be in a part of the airplane which will be last to collapse, giving the recorder-data capsule inertial propulsion, and, at the same time, giving the switches and contacts the longest possible reaction time. By this means the usual fore-to-aft crash deceleration will be generally parallel to the line of force reaction of the flight recorder-data capsule propulsion chamber thereby facilitating the rapid egress of the flight recorder-data capsule.

Another advantage in the hereinbefore mentioned position and orientation of the flight recorder-data capsule is in the fact forces inherent in the flight recorder-data capsule will, upon ejection of the capsule, be destined to move the capsule in a direction parallel to the flight of the airplane, which would be the direction in which the airplane would be least likely to move during incipient crash conditions, thus lessening the chances of the distressed aero-space vehicle impeding the escape of the flight recorder-data capsule.

The object of this invention is, therefore, to provide means whereby certain flight data and data pertaining to stresses imposed on an aero-space vehicle, such as an airplane, may be ascertained for scientific study following a disaster, for the purpose of determining the cause of the disaster.

Another object of the invention is to provide a flight recorder-data capsule which will be ejected automatically in response to abnormal acceleration forces imposed upon it from any direction except in the direction of flight of the vehicle in which it is positioned.

Another important object of the invention is to provide a flight recorder-data capsule which will be ejected automatically in response to an abnormal temperature rise within the capsule.

It is another object of this invention to provide a flight recorder-data capsule which will contain propulsion means that will separate the capsule from the distressed aero-space vehicle with explosive force without damaging the recorder-data capsule components.

It is yet another object of this invention to provide a flight recorder-data capsule which is detachably connected to a parachute that will automatically deploy the parachute to slow descent, and which will automatically free itself from the parachute upon contact with the earth or other fixed object.

It is yet another object of this invention to provide a flight recorder-data capsule which will automatically transmit a radio signal of a predetermined frequency in coded form after ejection from an aero-space vehicle to facilitate recovery thereof.

A further object of this invention is to provide a flight recorder-data capsule for use in aircraft which will automatically release a sea marker dye, such as fluorescein dye, in the event of a forced water landing, to facilitate recovery.

A still further object is to provide a flight recorder-data capsule, for use in aircraft, and which is automatically ejected from the aircraft in an emergency, in which the capsule is of simple and economical construction.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

In the drawings:

FIGURE 4 is a side elevational view of the flight recorder-data capsule with the parts shown on an enlarged scale.

FIGURE 5 is an end elevational view of the flight recorder-data capsule showing antenna bars in folded positions in full lines and in extended positions in dotted lines.

FIGURE 6 is a view looking upwardly toward the under surface of the capsule, and also showing the antenna bars in folded positions in full lines and in extended positions in dotted lines, the parts also being shown on an enlarged scale.

FIGURE 8 is a sectional plan taken on line 8—8 of

Figure 1:
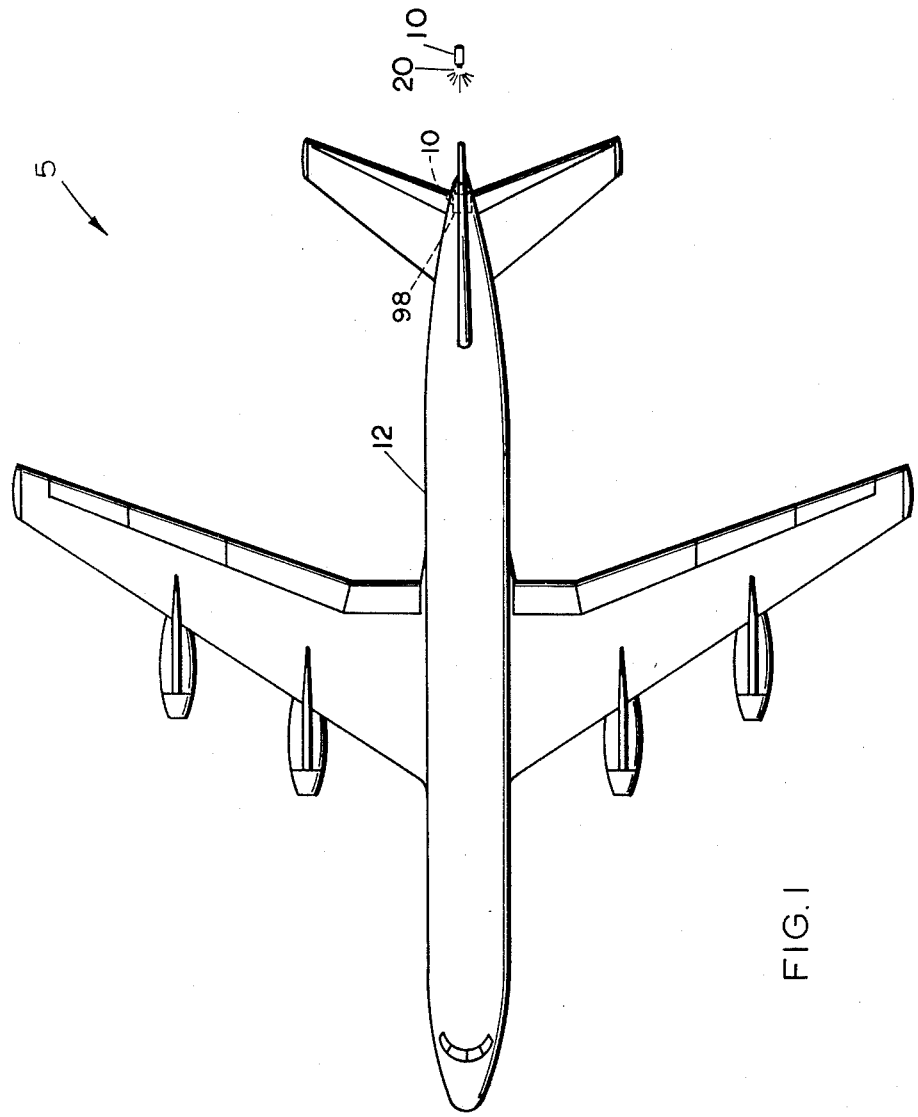
FIGURE 1 is a plan view of an airplane with a flight recorder-data capsule shown in the tail in dotted lines, and also with the flight recorder-data capsule illustrated in spaced relation to and following the airplane.
Figure 2:
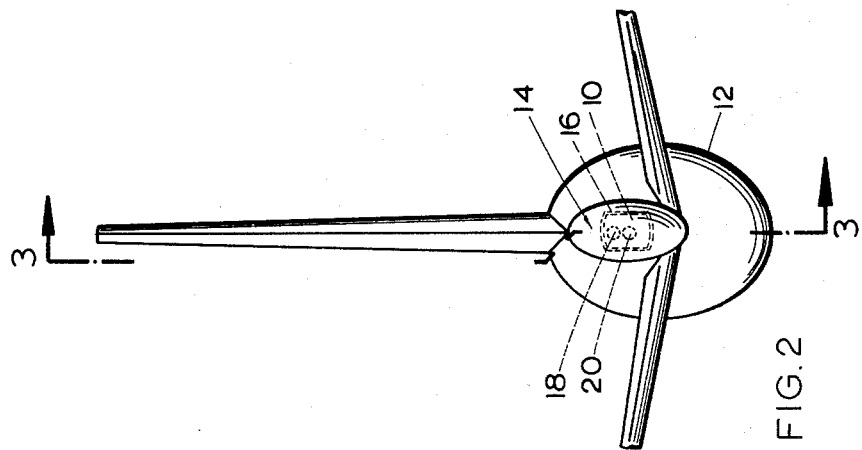
FIGURE 2 is a rear elevational view of the airplane also showing the flight recorder-data capsule in the tail portion and in dotted lines therein.
Figure 3:
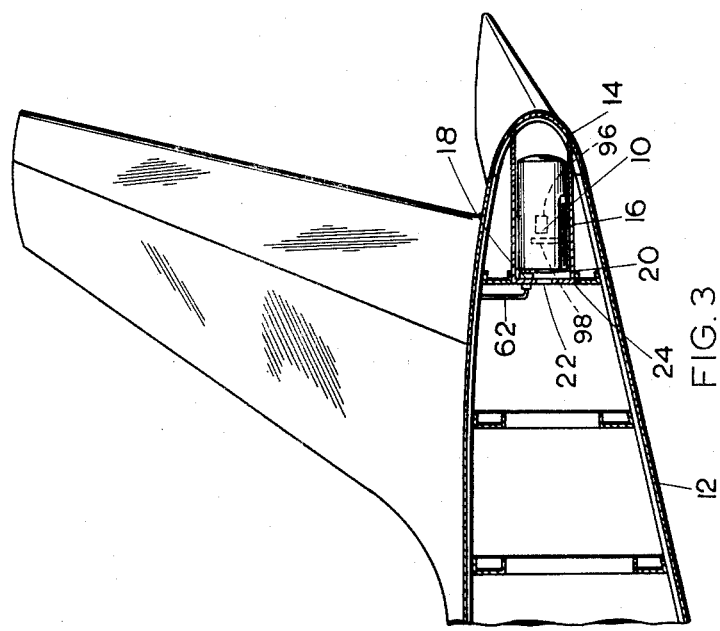
FIGURE 3 is a longitudinal section through the tail portion of an airplane, taken on line 3—3 of FIGURE 2, with the flight recorder-data capsule shown in elevation therein, and with the parts shown on an enlarged scale in relation to the illustration of FIGURE 1.
Figure 7:
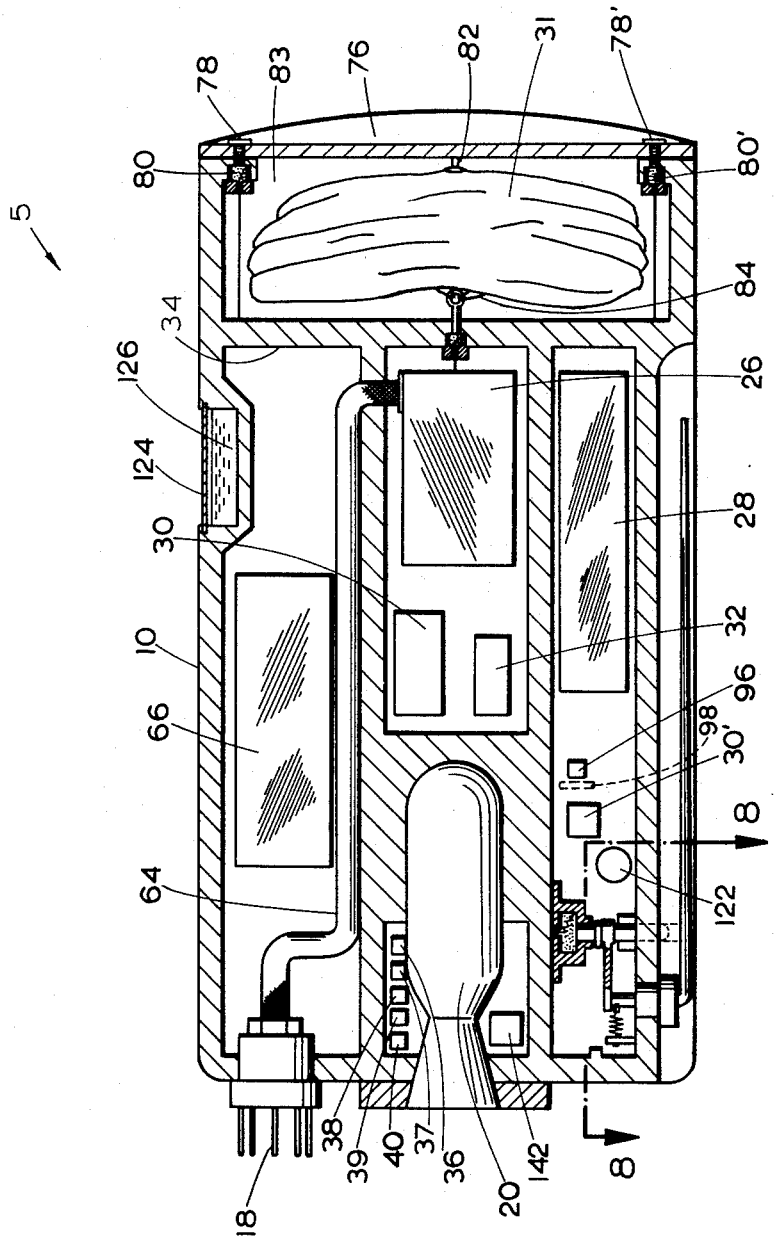
FIGURE 7 is a longitudinal section through the flight recorder-data capsule with the parts as shown in FIGURE 4, and with the capsule shown on a further enlarged scale, the section being taken on line 7—7 of FIGURE 5.

FIGURE 7, illustrating the antenna bar actuating elements with the bars shown in folded positions in full lines, and with one of the bars shown in an extended position in broken lines.

FIGURE 9 is a longitudinal section taken on line 9—9 of FIGURE 8 illustrating the squib explosive assembly.

FIGURE 10 is an end elevational view of the earth shock switch which is designed to energize the solenoid switch which initiates antenna erection and parachute release, the view also depicting an end elevational view of any one of the five crash shock switches.

FIGURE 11 is a longitudinal section through the crash shock switches, being taken on line 11—11 of FIGURE 10.

FIGURE 12 is a longitudinal section through the earth shock inertial switch, similar to that shown in FIGURE 11, except that the inertial piston locking pin is omitted.

Figure 13:
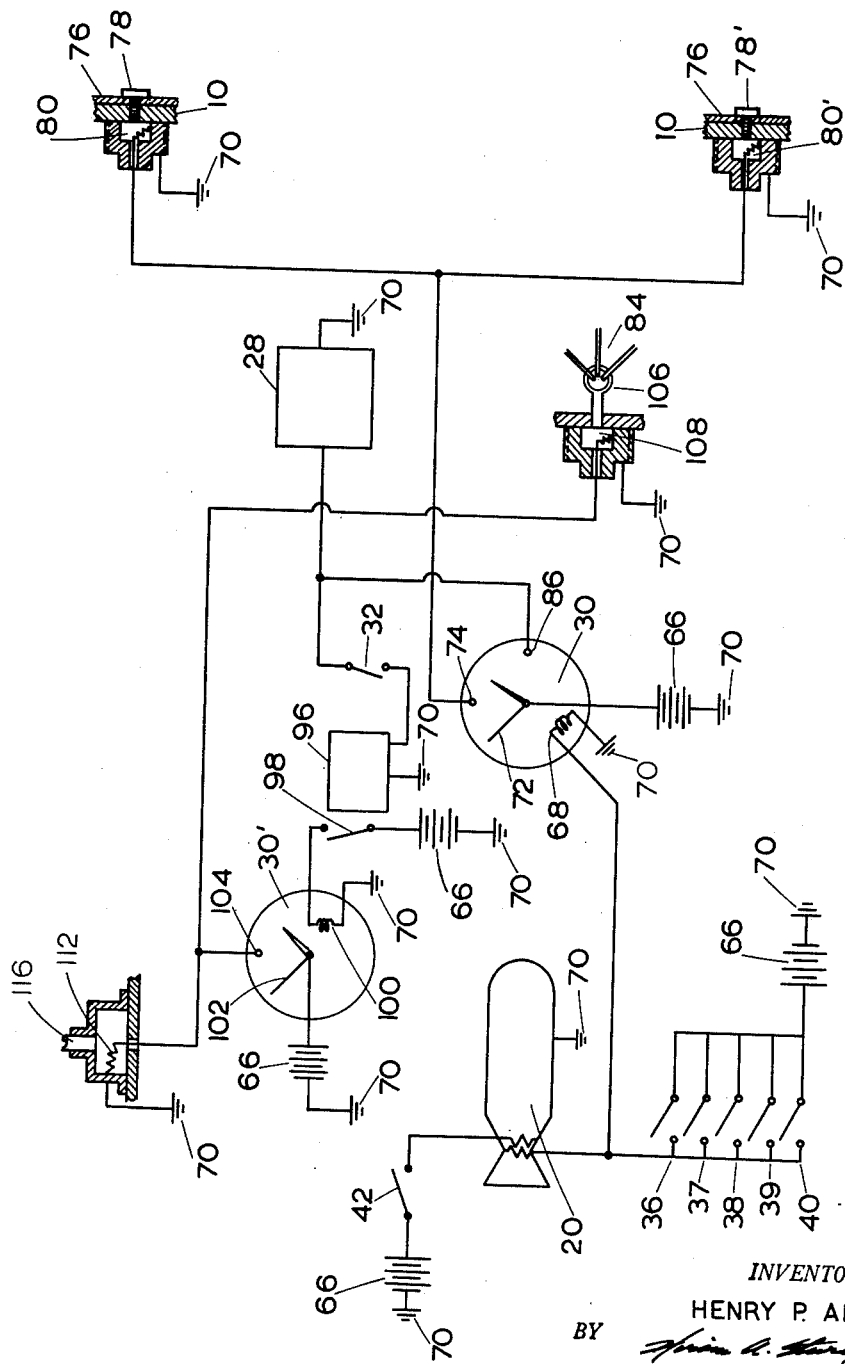

FIGURE 13 is a view showing a wiring diagram illustrating a circuit for connecting the elements of the ejectable flight recorder.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 5 refers to the invention in its entirety, numeral 10 including a flight recorder-data capsule, numeral 12 indicating an airplane in the tail portion 14 of which the capsule is positioned, numeral 16 indicating a recess in which the capsule is retained, numeral 18 indicating a coupling by which the capsule is connected to a multi-channel supply cable 62, numeral 20 indicating a propulsion rocket in the capsule, numeral 22 indicating a port in a fuselage bulkhead 24 through which rocket gases escape, numeral 26 a tape recorder positioned in the capsule and connected to the coupling 18, numeral 28 a high powered radio signal transmitter in the capsule, numeral 30 indicating a timing motor for actuating contacts that sequence a parachute 31, the radio signal transmitter 28, and energization of an earth shock inertial switch 32 shown in schematic form in FIGURES 7 and 13, numeral 34 indicating a bulkhead in the capsule and in which the parachute is held, numerals 36, 37, 38, 39, and 40 crash shock switches for completing circuits to the timing motor, and numeral 142 a temperature actuated switch for completing a circuit to the propulsion rocket and timing motor in the event of fire.

There are four instruments currently in production which make this invention practical, feasible and reliable. These devices are unique in that they are extremely small in size, thereby not contributing an appreciable amount of weight in a position in an airplane which would constitute an objectionable moment about the center of gravity of the airplane; they are ruggedly constructed so as to withstand shock loadings which would be encountered in the employment of this invention; and they are designed to provide a high degree of reliability so that they will provide dependable service in remote, unattended locations.

The first of these instruments is a subminiature multi-channel tape recorder 26 that is manufactured by Royston Instruments Ltd., of Great Britain. The instrument is indicated in schematic form in FIGURE 7, and provides a package which in the flight recorder measures 4½" x 5½" x 3", and weighs 11 pounds. It is provided in a solid light alloy cassette.

The second of these instruments is a miniature high powered radio signal transmitter 28 that is manufactured by the Telechrome Manufacturing Corporation. This instrument, which is indicated in schematic form in FIGURES 7 and 13 has the function of facilitating recovery of the flight recorder-data capsule. This radio transmitter measures 1²¹⁄₃₂" x 2⅞" x 4⅛" and weighs one pound.

The third instrument is a direct current timing motor 30 that is manufactured by the A. W. Haydon Company of Waterbury, Connecticut. The motor, which is indicated in schematic form in FIGURES 7 and 13, drives the contacts which sequence parachute 31 deployment, radio signal transmission, and energization of the earth shock inertial piston switch 32, shown in FIGURE 12, and also shown in schematic form in FIGURES 7 and 13. The largest dimension of the motor is approximately two inches.

The flight recorder-data capsule is provided with a battery 66 of the silver-zinc rechargeable battery cell type, such as marketed by Cook Batteries. The battery, which is indicated in schematic form in FIGURES 7 and 13 provides electrical power for the various capsule functions. The battery, or storage cell, designated by the manufacturer as SC-04, has a high energy to weight ratio, weighs ½ pound, and occupies less than one cubic inch in space, including terminals and a vent plug.

The automatic ejection of the flight recorder-data capsule 10 begins with the inertial closing of one of the five radially disposed geometrically oriented crash shock switches 36, 37, 38, 39 and 40, or of the temperature actuated switch 142.

FIGURE 11 shows a longitudinal section through the crash shock switches 36, 37, 38, 39 and 40, depicted by the numeral 42, and FIGURE 12 shows a longitudinal section through the earth shock switch 32. The switch 32 is similar to the switches 36, 37, 38, 39 and 40 except that the piston locking pin 58 is omitted in the switch 32.

The crash shock switches 36–40 include a body 42 having a bore 44 extended inwardly from one end, an inertial piston 46 slidably mounted in the bore and including an electrical conductor portion 48 and a dielectric portion 50, such as machined epoxy resin, an inertial piston cushion spring 52, two spring loaded inertial piston brushes 54 and 54', two terminal screws 56 and 56', contact bars 53 and 53' in the ends of which the screws 56 and 56' are positioned, brush retaining springs 55 and 55', and brush to contact bar wires 57 and 57'. The pin 58 is positioned in an opening 59, and the outer end of the opening 59 is provided with a closure plug 61 and a spring 61'. The bore 44 is also provided with a closure plug 60.

The inner end of the pin 58 rests on the outer surface of the piston 46 during normal operation of the aero-space vehicle, and during incipient crash conditions, is pushed down by spring 61' behind piston 46 into position, as shown by dotted lines 47, depicting the piston 46 in the spring 52 compressed position. The piston 46 is provided with a longitudinally disposed bore 49 providing a vent. The vent is positioned on the axis of the piston and extends through sections 48 and 50 thereof whereby pressure equalization is automatically provided, allowing the switch to be hermetically sealed.

The temperature actuated switch 142 is a conventional fuse link, positive locking electric switch.

In the description of the sequence of events in the operation of the flight recorder-data capsule the following three types of disaster cases should be considered:

Case I—An airplane strikes the earth with explosive force, or explodes in flight.

Case II—An airplane strikes the earth with less than explosive force, such as in a disaster immediately following takeoff, becomes enveloped in fuel, and burns.

Case III—An airplane strikes the earth with less than explosive force, such as in a disaster immediately following takeoff, and does not burn.

Under normal flight conditions and prior to a disaster, flight performance data is being fed to the recorder 26 in the flight recorder-data capsule 10 by way of the multi-channel cable 62 by way of the flight recorder-data capsule data cable 64. Transducers, which originate data impulses, and the recorder are powered by the airplane electrical system.

*Case I.*—When an airplane, in which the flight recorder-data capsule is positioned, accidentally strikes the earth with explosive force, or explodes while in flight, one of the five geometrically oriented crash shock switches 36–40 closes an electric circuit which initiates ejection and propagates the series of events leading to recovery of the flight recorder-data capsule 10. The crash shock switches 36–40 are geometrically oriented so that the inertial pistons are aligned in five different directions, or at angles of substantially ninety degrees. This arrangement makes the inertial pistons sensitive to deceleration or shock in all cardinal directions of possible deceleration except in the direction opposite to that of normal travel of the aircraft. The inertial piston 46 will compress the inertial piston spring 52. This spring 52 is designed to be compressed by the inertial piston 46 under a predetermined shock or deceleration loading.

The appropriate crash shock switch 36–40 inertial piston 46 under shock or deceleration loading compresses the spring 52 and in so doing allows an electrical current to flow from the battery power source 66, through the electrical conductor portion 48 of the inertial piston 46, the crash shock switch terminal screw 56', the spring loaded brush 54', and the spring loaded brush 54 to the terminal screw 56. After the piston 46 moves a certain distance, the locking pin 58 is snapped into position behind the piston, as shown by the dotted lines 47 in FIGURE 11. This completes a circuit to the propulsion rocket 20 and to the winding 68 of the timer motor 30. With the propulsion rocket firing initiated, the circuit is completed through the timer motor winding 68 to the ground as indicated by the numeral 70.

After a predetermined time period, following the initiation of the propulsion rocket firing, the second hand 72 of the timer engages contact 74 which completes an electric circuit between the battery 66 and the parachute cover explosive squibs 80 and 80' through the bolts 78 and 78'. The simultaneous explosion of the squibs 80 and 80' drives the parachute compartment cover from the capsule 10. The parachute cover 76 is connected to the parachute by a frangible link 82 which will break when tension is applied to the parachute shrouds 84, whereby the cover will fall free. The flight recorder-data capsule, which is suspended from the parachute, is then free to fall earthward.

During this operation, and with continued travel of the second hand 72 of the timer 30, the hand engages contact 86, after a predetermined period of time, and stops in this position. This causes electrical current to initiate and maintain operation of the radio transmitter 28 which will broadcast a coded signal of a predetermined frequency to facilitate recovery.

The radio transmitter may be used to transmit data recorded on the tape. However, the primary function of the radio transmitter 28 is to broadcast a signal which shall be used in conjunction with a series of radio direction finders to determine the geographical location of the flight recorder-data capsule after it comes to rest on the surface of the earth.

Electrical current from the power source 66 through the timer hand 72 to contact 86 will also energize one of the terminals 88 of the earth shock switch 32, shown in FIGURE 12. The earth shock switch 32 is identical in construction to the crash shock switches 36–40, depicted by numeral 42 in FIGURE 11, except that the locking pin 58 is omitted.

Upon engagement of the flight recorder-data capsule 10 with the surface of the earth, the inertial piston 92 of the earth shock switch 32 compresses the restraining spring 90 which is designed to compress under a predetermined shock of deceleration loading. When the piston 92 of the earth shock switch 32 moves in the direction of spring 90, a circuit is completed through the electrical conductor portion 94 of the piston 92 to the terminal screw 88'. This momentary flow of electrical current energizes solenoid 96, the armature of which closes and locks switch 98.

The switch 98 is oriented so that a crash shock or parachute opening shock will tend to retain it in an open position. This will prevent premature sequencing of the parachute release and antenna erection mechanism. When the solenoid switch 98 is closed and locked, electrical current flows continuously to the winding 100 of the motor timer 30'. After a predetermined length of time, the second hand 102 of the timer 30' moves to contact 104. This causes electrical current to flow to the shroud hook 106 of the parachute, release the squib 108, and the antennae 110 and 110' erection squib 112, shown in FIGURES 9 and 13.

Upon explosion of the parachute shroud hook squib 108, the parachute shroud hook 106 is released from the flight recorder-data capsule 10 so that the capsule will not be dragged over the surface of the earth by the parachute.

The electrical current passing through the contact 104 of timer motor 30' causes erection squib 112 of antennae 110 and 110' to explode, as illustrated in FIGURES 9 and 13 thereby driving pin 116, shown in FIGURES 8, 9 and 13, of antenna erection restraining cables 114 and 114' out of the capsule 10 through the port 118. The egress of the pin 116 releases the tension in the restraining cables 114 and 114' allowing springs 120 and 120' to compress. Spring 120 is connected, at one end, to a crank pin 128 which is rigidly connected to an arm 130 that is rigidly connected to an antenna shaft 132. When the squib 112 explodes, the pin 116 releases the tension in the restraining cable 114 which causes the spring 120, connected to the arm 130 at the crank pin 128, to raise the antenna 110. The antenna 110' is actuated by the cable 114' in a similar manner.

Springs 120 and 120' are of sufficient strength to raise only the weight of the antennae 110 and 110', respectively, and will not raise the flight recorder-data capsule 10 with the antennae. Assuming that the capsule 10 comes to rest, as shown in FIGURE 6, only antenna 110' will raise. The radio transmitter 28 is connected to the top antennna 110' by a gravity actuated mercury switch 122, as shown in FIGURE 7. In the event of a water landing both antennae 110 and 110' will be erected. However, the radio transmitter 28 is connected to the top antenna 110' only, and this is connected through the mercury swich 122.

All voids of the flight recorder-data capsule are filled with cellular Styrofoam plastic to provide buoyancy which will enable the capsule to float. The capsule is provided with a cavity 126 which is sealed by a closure 124 of gelatin, or other water soluble material, and upon landing in water, the closure 124 will dissolve, permitting the escape of a concentrated fluorescein dye which will be distributed over the surface of the water to facilitate recovery of the capsule.

*Case II.*—The airplane accidentally strikes the earth with less than explosive force, such as would happen immediately after take-off, and becomes enveloped in fuel and burns, whereby the temperature actuated switch 142 is closed. In this case a circuit is completed from the battery 66 to the capsule propulsion rocket 20 only. Since the capsule, in this case, is automatically ejected while the airplane is on the ground, and the airplane is substantially intact, it will be readily located by observing the alignment of the fuselage.

*Case III.*—The airplane accidentally strikes the earth with less than explosive force, as would be the case immediately following take-off, and does not burn. In this case the flight recorder-data capsule is removed manually from the airplane for analysis.

Operation

With the parts assembled as illustrated and described the flight recorder-data capsule is installed in a pocket or recess 16 in the tail portion 14 of a fuselage 12 of an aero-space vehicle, or other aircraft, and the socket 18 is separably connected to a conduit 62 through which electrical impulses are fed to a tape recorder 26 from the cockpit or other parts of the vehicle.

The normal operation of the airplane causes a continuous message to be recorded on the tape indicating that the engines or jets are functioning properly, and should a failure occur in the operation of a power unit, or should there be an interruption in the operation thereof, it will be transmitted to the tape, and upon reproduction of the tape message the operation of the engine, jet, or other power unit will be readily ascertained.

Should operation of the aircraft be accidentally terminated by a power unit failure, collision, or disaster the flight recorder-data capsule will be automatically ejected from the aircraft and upon coming to rest the antennae of the capsule will be set up and radio signals, such as signals indicating the location of the capsule will be transmitted or broadcast. By this means the location of the flight recorder-data capsule and the wrecked aircraft will be readily determined.

From the foregoing specification, it is thought to be obvious that a flight recorder-data capsule constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

What is claimed is:

1. In a flight recording data capsule, the combination which comprises an aircraft having a fuselage with a cavity in the trailing end of the fuselage, a capsule positioned in the cavity of the aircraft, a propulsion rocket in the capsule for ejecting the capsule from the aircraft, a parachute in said capsule, latches for retaining the parachute in the capsule, a tape recorder in said capsule, a multiple cable extended from said tape recorder to signal means in the aircraft whereby signals designating the operation of elements of the aircraft are transmitted to the tape recorder, a radio signal transmitter positioned in the capsule and arranged to transmit signals of the tape recorder for designating the operation and location of the aircraft, a battery in the capsule for supplying current to the tape recorder and transmitter, crash shock actuated switches positioned in said capsule, and explosive means actuated by said crash shock actuated switches for actuating said latches to release said parachute.

2. In combination with a capsule as described in claim 1, an antenna carried by the capsule, and explosive means for actuating the antenna to an operative position.

3. In combination with a capsule as described in claim 1, a timer motor in the capsule for initiating operation of the transmitter.

4. In combination with a capsule as described in claim 1, means for releasing the capsule from the parachute to prevent dragging of the capsule over the ground.

5. In combination with a capsule as described in claim 1, a temperature actuated switch in the capsule for closing circuits to said parachute actuating latches and transmitter upon explosion of the aircraft.

References Cited in the file of this patent

UNITED STATES PATENTS

| | | |
|---|---|---|
| 2,328,208 | Friedman | Aug. 31, 1943 |
| 2,470,783 | Mead | May 24, 1949 |
| 2,519,553 | Faulkner | Aug. 22, 1950 |
| 2,552,181 | Kleinhans | May 8, 1951 |
| 2,555,352 | Lowell et al. | June 5, 1951 |
| 2,579,831 | Keinath | Dec. 25, 1951 |
| 2,686,025 | Klas | Aug. 10, 1954 |
| 2,702,680 | Heinemann et al. | Feb. 22, 1955 |
| 2,759,693 | Gross | Aug. 21, 1956 |
| 2,959,671 | Stevinson | Nov. 8, 1960 |